United States Patent [19]

Tabata et al.

[11] 4,420,758

[45] Dec. 13, 1983

[54] ELECTROTHERMIC NON-IMPACT RECORDING METHOD AND APPARATUS

[75] Inventors: Yukio Tabata; Toshiyuki Kawanishi, both of Numazu, Japan

[73] Assignee: Ricoh Company, Ltd., Japan

[21] Appl. No.: 382,099

[22] Filed: May 26, 1982

[30] Foreign Application Priority Data

May 26, 1981 [JP] Japan .................. 56-79848
May 26, 1981 [JP] Japan .................. 56-99164

[51] Int. Cl.³ .................. G02B 7/06

[52] U.S. Cl. .................. 346/76 PH; 346/1.1; 400/120

[58] Field of Search .................. 346/1.1, 76 PH; 400/120

[56] References Cited

U.S. PATENT DOCUMENTS 4,309,117 1/1982 Chang et al. .............. 346/76 PH X
4,345,845 8/1982 Bohnhoff et al. .......... 346/76 PH X

*Primary Examiner*—Joseph W. Hartary
*Assistant Examiner*—Derek Jennings
*Attorney, Agent, or Firm*—Guy W. Shoup; Gerard F. Dunne

[57] ABSTRACT

Electrothermic non-impact recording method and apparatus capable of printing with electroconductive thermal-transferable ink on a recording medium by reciprocating a recording head relative to the recording medium, which recording head comprises (i) a plurality of recording styli and (ii) a return electrode in contact with an electroconductive ink ribbon comprising a thermal-transferable ink material, the ink ribbon being in contact with a receiving surface of a recording medium; by applying between selected recording styli and the return electrode an image-delineating electric current, through resistor elements, each of which is connected between each of the recording styli and each of the output terminals from which the image-delineating electric current is output, the resistance of each resistor element being in the range of 1/10 to 10 times the resistance of the portion of the ink ribbon between each recording stylus and the return electrode, thus causing the image-delineating electric current to flow through the portions in the ink ribbon immediately below the selected recording styli and to generate Joule's heat in those portions, by which Joule's heat the thermal-transferable ink material in those portions is melted and made transferable; and by transferring the thermal-transferable ink material from the ink ribbon to the recording medium.

9 Claims, 4 Drawing Figures

ELECTROTHERMIC NON-IMPACT RECORDING METHOD AND APPARATUS

BACKGROUND OF THE INVENTION

The present invention relates to an electrothermic non-impact recording method and apparatus employing an electroconductive ink ribbon containing or coated with a thermal-transferable ink material which is transferred to a receiving surface, for instance, a sheet of paper, upon being heated above a predetermined temperature.

Conventionally there has been proposed an electrothermic non-impact recording method and apparatus in which a recording electrode having a plurality of recording styli arranged in one or more rows, and a return electrode, are brought into contact with an ink ribbon of the above-mentioned type, which ink ribbon is superimposed on a receiving surface. An image-delineating electric current is caused to flow through the ink ribbon, and a thermal-transferable material softened in an image pattern by Joule's heat generated in the ink ribbon immediately below the recording styli, is transferred to the receiving surface.

In this recording method and apparatus, it can occur that an image-delineating signal voltage is applied to a plurality of the recording styli at the same time. Therefore, if portions of the ink ribbon immediately below some of the recording styli happen to be smaller in surface resistivity than are other portions of the ink ribbon, more electric current flows through the portions of the ink ribbon with the smaller surface resistivity than through the other portions thereof. The result is that image dots formed on the ink ribbon are non-uniform in density, or so-called "halos" are produced.

SUMMARY OF THE INVENTION

It is therefore an object of the present invention to provide an electrothermic non-impact recording method employing an electroconductive ink ribbon containing a thermal-transferable ink material, capable of providing high and uniform image density, with the above-described conventional shortcomings being eliminated therefrom.

Another object of the present invention is to provide an electrothermic non-impact recording apparatus capable of performing the above-mentioned non-impact recording method.

In the non-impact recording method according to the present invention, an electroconductive ink ribbon is placed in contact with a recording sheet. A recording electrode head comprising (i) a plurality of recording styli arranged in one or more rows, and (ii) a return electrode, is also disposed in contact with the electroconductive ink ribbon in such a manner that the ink ribbon is sandwiched between the recording sheet and the two electrodes. An image signal application apparatus is connected between the recording electrode and the return electrode, so that an image-delineating signal current is caused to flow through the portion of the ink ribbon between the two electrodes. Upon the image-delineating signal voltage being applied, Joule's heat is generated within the ink ribbon portion immediately below the recording styli, so that the thermal-transferable material is softened by the heat and is then transferred to a recording sheet.

The key feature of the present invention is that a resistor element is connected between each of the recording styli and each of the output terminals of the image signal application apparatus. These resistor elements serve as buffer means for the recording styli with respect to the image-delineating current therefrom, even if the surface resistivity of the ink ribbon varies from place to place, and are capable of minimizing the effects of different surface resistivities of the ink ribbon on the quality of images formed on the recording sheet. The resistance of each resistor element is in the range of 1/10 to 10 times the resistance of the portion of the ink ribbon between each recording stylus and the return electrode.

The electrothermic non-impact recording apparatus according to the present invention comprises the above-described recording electrode and return electrode which are disposed with a predetermined space therebetween and are in close contact with the electroconductive ink ribbon, which ink ribbon is superimposed on a recording sheet; an image signal application apparatus for applying image-delineating signal voltages between the recording electrode and the return electrode; and a reciprocating means for reciprocating the recording electrode and the return electrode, while keeping the two electrodes in close contact with the ink ribbon, whereby the thermal-transferable ink material contained in the ink ribbon, immediately below the actuated recording styli of the recording electrode, is transferred to the recording sheet.

DETAILED DESCRIPTION OF THE PREFERRED EMBODIMENTS

Referring to the accompanying drawings, embodiments of an electrothermic non-impact recording method and apparatus according to the present invention will now be explained.

Figure 1:
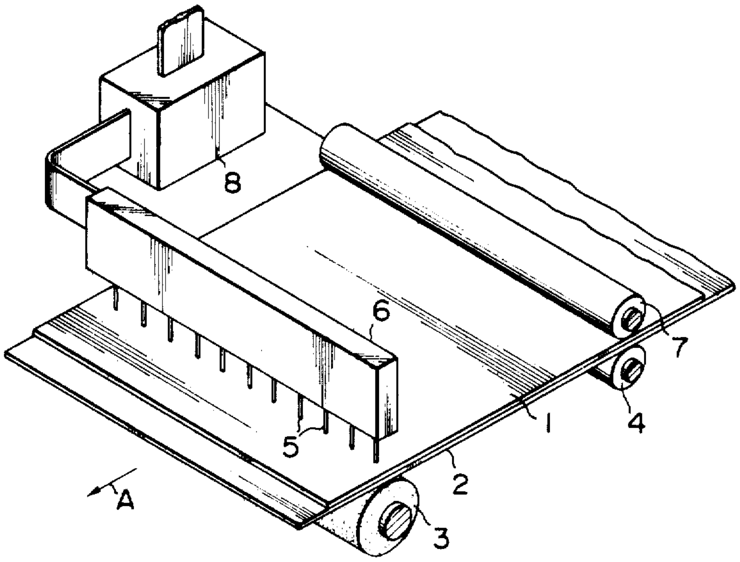
FIG. 1 is a partially cut-away perspective view of an electrothermic non-impact recording apparatus according to the present invention.

In FIG. 1, reference numeral 1 represents an selectroconductive ink ribbon containing or coated with a thermal-transferable ink material, which ink material is transferred to a receiving surface after being melted by the Joule's heat generated within the ink ribbon under application of an electric current thereto. Below the ink ribbon 1, there is placed a recording sheet 2 in contact with the ink ribbon 1. The ink ribbon 1 and the recording sheet 2 are transported, while supported by support rollers 3 and 4, in the direction of the arrow A.

Above the ink ribbon 1, there is situated an electrically insulating support member 6 for supporting a recording electrode which comprises a plurality of recording styli 5 arranged in a row with predetermined spaces therebetween. The lower portion of each recording stylus 5 is in contact with the surface of the ink ribbon 1. Further, there is disposed a return electrode 7, substantially parallel to the row of recording styli 5. The return electrode 7 is also in contact with the surface of the ink ribbon 1 with a contact area with the ink ribbon 1 at least five times greater than the total contact area with the ink ribbon 1 of the recording styli 5.

An image-delineating signal application apparatus 8 is connected to the recording styli 6 and the return electrode 7.

Figure 2:
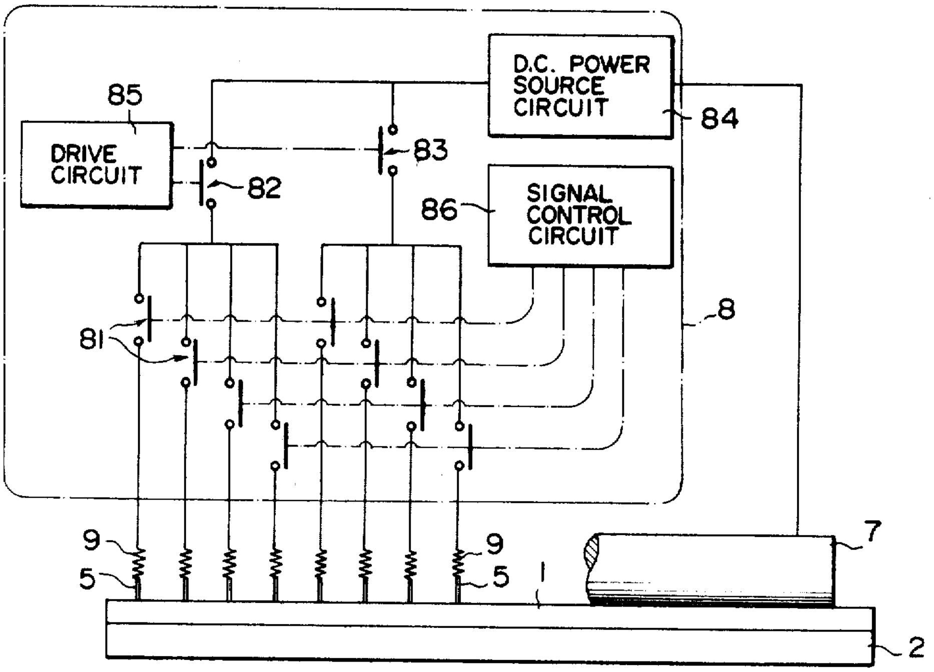
FIG. 2 is a circuit diagram of an image-delineating signal current application apparatus for use in the electrothermic non-impact recording apparatus according to the present invention, for instance, for use in the recording apparatus as shown in FIG. 1.

The image-delineating signal application apparatus 8 comprises, for instance, as shown in FIG. 2, two groups of imaging switches 81, each group consisting of 4 imaging switches 81.

As shown in the figure, the two groups of the imaging switches 81 are connected to a D.C. power source circuit 84 through scanning switches 82 and 83. The opening and closing of the scanning switches 82 and 83 are controlled by a drive circuit 85. The opening and closing of the imaging switches 81 are controlled by a signal control circuit 86, which receives image signals, corresponding to image information to be recorded, from a photoelectric conversion element such as a CCD (Charge Coupled Device) type image sensor (not shown). The imaging switches 81 are connected to the recording styli 5 through resistor elements 9 as shown in FIG. 2. The resistance of each resistor element 9 is in the range of 1/10 to 10 times (preferably ½ to 2 times) the resistance of the portion of the ink ribbon 1 between each recording stylus 5 and the return electrode 7.

Under the condition that only the scanning switch 82 is closed by the drive circuit 85, the four imaging switches 81 which are connected to the scanning switch 82, are selectively closed by the signal control circuit 86 upon application of image signals thereto. Likewise, under the condition that only the other scanning switch 83 is closed by the drive circuit 85, the four imaging switches 81, which are connected to the scanning switch 83, are selectively closed by the signal control circuit 86 upon application of image signals thereto. When the scanning switch 82 and the imaging switches 81 (or the scanning switch 83 and the imaging switches 81) are all closed, an image-delineating signal voltage can be applied between the recording styli 5 (connected to the imaging switches 81) and the return electrode 7 by the D.C. power source circuit 84.

When an image-delineating signal voltage is applied between one or more selected recording styli 5 and the return electrode 7, the corresponding image-delineating current flows through the portion of the ink ribbon 1 between the selected recording stylus or styli 5 and the return electrode. Since the contact area with the ink ribbon 1 of the return electrode 7 is significantly greater (at least five times greater) than the total contact area with the ink ribbon 1 of the recording styli 5, and, of course, greater than the contact area with the ink ribbon 1 of each recording stylus 5, and since the same amount of electric current flows through the recording styli 5 as through the return electrode 7, the current density in the portion of the ink ribbon 1 immediately below each recording stylus 5 is extremely greater than the current density in the portion of the ink ribbon 1 immediately below the return electrode 7. Therefore, in comparison with the Joule's heat generated below the return electrode 7, an extremely great amount of the Joule's heat is generated below the recording styli 5. As a result, by selection of electroconductive thermal-transferable ink with an appropriate melting point, and by supplying an appropriate amount of electric current, only the electroconductive thermal-transferable ink material present immediately below the recording styli 5 is melted by the Joule's heat and is then transferred to the recording sheet 2.

The entire surface of the ink ribbon 1 is not always uniform in surface resistivity. There may be portions in which the surface resistivity is lower than in other portions. In the present invention, a resistor element 9 is inserted between each output terminal of the image-delineating signal application apparatus 8 and each recording styli 5, whereby the flow of excess electric current through the low-resistivity portion of the ink ribbon 1 is prevented and, therefore, only a negligible difference in the flow of image-delineating electric current between the low-resistivity portion and the other portions is caused, even if such a low-resistivity portion of the ink ribbon 1 happens to come under a plurality of the recording styli 5 and an image-delineating signal voltage is applied to those recording styli 5 at the same time. Thus, images with uniform image density can be obtained.

In the above case, when the resistance of each resistor element 9 is smaller than 1/10 of the resistance of the portion of the ink ribbon 1 between each recording stylus 5 and the return electrode 7, the resistor elements 9 do not serve to minimize the difference in the flow of image-delineating electric current between the low-resistivity portions and the other portions. On the other hand, when the resistance of each resistor element 9 is greater than 10 times the resistance of the portion of the ink ribbon between each recording stylus 5 and the return electrode 7, the electric current which flows through the ink ribbon 1 is generally insufficient for generating Joule's heat within the ink ribbon 1 for melting the thermal-transferable material contained in the ink ribbon 1.

Therefore, it is preferable that the resistance of each resistor element 9 be in the range of 1/10 to 10 times the resistance of the portion of the ink ribbon 1 between each recording stylus 5 and the return electrode 7.

The non-impact recording method and apparatus according to the present invention can be applied to any kind of ink ribbon containing a thermal-transferable ink material which is fused and becomes transferable when heated to a predetermined temperature. The following ink ribbons are particularly suitable for use in the present invention:

(1) Single layer type ink ribbon

This ink ribbon itself is electroconductive and thermal-transferable, and comprises a thermofusible resin, such as vinyl chloride acetate copolymer, butadiene-styrene copolymer, acrylic resin, polycarbonate, polyester resin, polyvinyl butyral resin, cellulose acetate resin and terpene polymers; and an electrically conductive material, such as carbon black and metal particles, and, if necessary, pigments, and auxiliary agents, such as plasticizers, dispersants and stabilizers. It is preferable that the thickness of the single layer type ink ribbon be in the range of 5 $\mu$m to 50 $\mu$m, and the electric resistivity be in the range of $1\times10^{-2}\Omega$cm to $1\times10^{3}\Omega$cm.

(2) Double layer type ink ribbon

This ink ribbon comprises a support material and an ink layer. The support material comprises a resin, such as polycarbonate, polyester, an butadiene-styrene copolymer, or acrylic resin; and an electrically conductive material, such as carbon black. The ink layer comprises a thermo-fusible material, such as vinyl chloride acetate copolymer, butadiene-styrene copolymer, acrylic resin, polycarbonate, polyester resin, polyvinyl butyral resin, cellulose acetate resin, waxes, and styrene-acrylic ester copolymer; and an electrically conductive material, such as conductive carbon black and metal particles, and, if necessary, pigments, and auxiliary agents, such as plasticizers, dispersants and stabilizers. It is preferable that the thickness of the support material be in the range of 0.5 μm to 20 μm and the electric resistivity thereof be in the range of $1\times10^{1}\Omega$cm to $1\times10^{3}\Omega$cm. It is preferable that the thickness of the ink layer be in the range of 1 μm to 25 μm, and the electric resistivity thereof be in the range of $1\times10^{-2}\Omega$cm to $1\times10^{2}$ Ωcm.

(3) An electrically anisotropic ink ribbon

This ink ribbon varies in electric conductivity with direction, for instance, an ink ribbon as disclosed in Japanese Patent Publication No. 56-10191, in which the conductivity is made greater in the transverse direction (normal to the surface) than in the superficial direction (parallel with the surface) by distributing electrically conductive particles in a chain-like manner in the transverse direction throughout the ink ribbon.

In all of these ink ribbons, since the ink layers are electrically conductive to the extent as described above, and Joule's heat is generated within the ink layer, images with higher resolution can be obtained, in comparison with the ink ribbons in which the ink layer is indirectly heated. This is because the heat acts in a concentrated manner in the ink where it is generated, in contrast with the case where it is generated in a layer above the ink layer and is then conducted to the ink layer, radiating outward from its source and being less concentrated ("focused") by the time it acts on the ink.

In the present invention, it is preferable that the distance between each recording stylus 5 and the return electrode 7 be in the range of about 0.1 mm to about 500 mm.

Furthermore, the recording styli 5 can be divided into m blocks, each of which blocks consists of n styli 5, and image-delineating signals can be successively applied to all the recording styli 5 of each block. Alternatively, depending upon the image, the image-delineating signals can be simultaneously applied to all the recording styli 5 of each block.

The present invention will now be explained more specifically by referring to the following examples.

EXAMPLE 1

A single layer type ink ribbon was prepared by dispersing 75 parts by weight of polvinyl butyral and 25 parts by weight of carbon black in ethyl alcohol, applying the dispersion on a flat glass plate, drying it to form an ink layer with a thickness of 20 μm and a width of 100 mm, and peeling the ink layer off the glass plate.

In the apparatus shown in FIG. 1, as the resistor elements 9, resistor elements with a resistivity of 1KΩ were inserted between the output terminals of the image-delineating signal application apparatus 8 and the recording styli 5. The diamater of each recording stylus 5 was 130Ωm. The recording styli 5 were arranged with a density of approximately 8 styli per mm. The distance between the row of the styli 5 and the return electrode 7 was 20 mm.

A pulse voltage of 200 V with a pulse width of 1 msec was applied to each of 10 recording styli 5 successively. The electric current which flowed through the ink ribbon 1 was 120 mA and the resistance of the portion of the ink ribbon 1 between each recording stylus 5 and the return electrode 7 was 1.6KΩ. The result was that 10 dots were clearly recorded with the dot densities (corresponding to image density) being in the range of 1.6 to 1.8 (measured by a microdensitometer) and with the dot diameters ranging from 140 μm to 180 μm.

A voltage of 200 V was then applied to 10 recording styli 5 simultaneously. The result was that 10 dots were clearly recorded with the dot densities being in the range to 1.3 to 1.6 (measured by a microdensitometer) and with the dot diameters ranging from 120 μm to 150 μm.

In the above described experiments, the density of the dots was uniform and halos were not produced at all.

COMPARATIVE EXAMPLE 1

Under the same conditions as those in Example 1, except that the resistor elements were eliminated, dot formation tests were conducted by use of the same single layer type ink ribbon as that employed in Example 1.

When a pulse voltage of 200 V with a pulse width of 1 msec was applied to each of 10 recording styli 5 successively, 120 mA of electric current flowed through the ink ribbon 1 and the resistance of the portion of the ink ribbon 1 between each recording stylus 5 and the return electrode 7 was 1.6KΩ. The result was that, of the 10 attempts, only 7 dots were recorded, and their dot densities (corresponding to image density) were in the range of 0.5 to 1.3 (measured by a microdensitometer) and their dot diameters were in the range of 30 μm to 100 μm.

When a pulse voltage of 200 V with a pulse width of 1 msec was then applied to 10 recording styli 5 simultaneously, only 3 dots were recorded. These three dots had dot densities ranging from 1.5 to 2.0 and dot diameters ranging from 170 μm to 200 μm.

Figure 3:
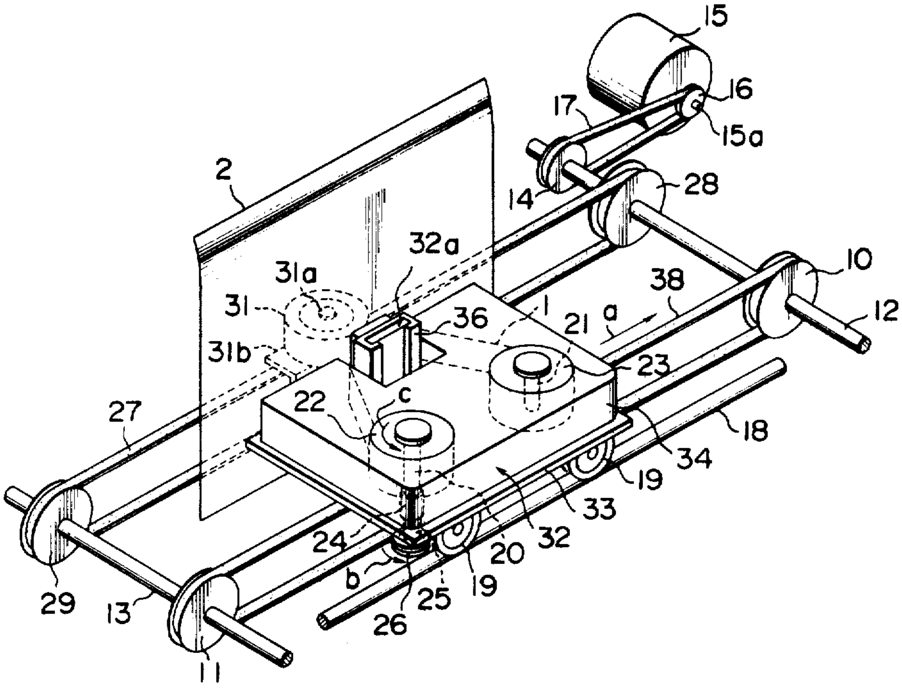
FIG. 3 is a partially cut-away perspective view of another electrothermic non-impact recording apparatus according to the present invention.

Referring to FIG. 3, there is shown a partially cutaway perspective view of another electrothermic nonimpact recording apparatus according to the present invention, in which the same image-delineating signal application apparatus and resistor elements as those employed in Example 1 are incorporated, but are not shown in the figure.

Figure 4:
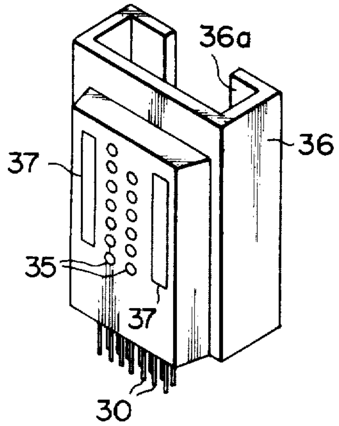
FIG. 4 is a partially cut-away perspective view of a recording electrode, a return electrode and a support member for supporting the recording electrode and the return electrode for use in the electrothermic non-impact recording apparatus shown in FIG. 3.

In the figure, reference numeral 31 represents a platen; reference numeral 2, a recording medium which is disposed in such a manner than one side thereof is in contact with the platen 31; reference numeral 1, an ink ribbon which is disposed so as to be in contact with the other side of the recording medium 2. As shown in FIG. 4 reference numeral 35 represents recording styli; and reference numeral 37 represents return electrodes which are located at a predetermined distance from the recording styli 35.

The recording styli 35 and the return electrodes 37 are supported by an electrode support member 36 as shown in FIG. 4 and are disposed so as to be in close contact with the ink ribbon 1 as shown in FIG. 3.

As shown in FIG. 4, the recording styli 35 are arranged zig-zag in two rows.

The electrode support member 36 is mounted on a carriage member 32 through a support member **32*a***.

The support member 32*a* is detachably fitted into a groove 36*a* formed on the back side of the electrode support member 36. In the lower portion of the electrode support member 36, there are formed connection terminals 30 by which the recording styli 35 and the return electrodes 37 can be connected to the previously described image-delineating signal application apparatus (not shown in FIG. 3). The connection terminals 30 can be connected to the image-delineating signal application apparatus by fitting the support member 32*a* into the groove 36*a* of the electrode support member 36. Under the carriage member 32, there is disposed an endless belt 38, which is extended in the reciprocating direction of the carriage member 32 and trained over two pulleys 10 and 11. The pulley 10 is mounted on a rotary shaft 12, while the pulley 11 is mounted on a rotary shaft 13.

A transmission pulley 14 is also mounted on the rotary shaft 12 of the pulley 10. Near the transmission pulley 14, there is disposed a motor 15 for rotating the transmission pulley 14 in the normal and reverse directions. A drive pulley 16 is mounted on a rotary shaft 15*a* of the motor 15. An endless belt 17 is trained over the drive pulley 16 and the transmission pulley 14, so that the rotation force of the drive pulley 16 is transmitted to the transmission pulley 14 through the endless belt 17. By the rotation of the rotary shaft 12, the pulleys 10 and 11 are rotated by the endless belt 38 which is trained over the two pulleys 10 and 11. The carriage member 32 is fixed in an upper portion of the endless belt 38. A guide rod 18 is disposed parallel with the endless belt 38 at a predetermined distance from the endless belt 38. In the lower portion of the carriage member 32, there are disposed two rollers 19 in such a manner that the two rollers 19 are rotatable along the guide rod 18. By the rotations (normal or reverse) of the motor 15, the endless belt 38 is reciprocated. As a result, the carriage member 32 fixed to the endless belt 38 is also reciprocated parallel with the recording medium 2.

The carriage member 32 is constructed so as to have room for incorporating therein two rotatable ink ribbon reels 22 and 23, which are respectively mounted on reel shafts 20 and 21. In FIG. 3, the left portion of the ink ribbon 1 is wound onto the pulley 22, while the right portion of the ink ribbon 1 is wound onto to the reel 23. The mid-portion of the ink ribbon 1 between the two reels 22 and 23 is positioned between (i) the recording medium 2 and (ii) the recording styli 35 and the return electrodes 37.

The lower portion of the reel shaft 20 is connected to a rotary shaft 25 through a one-way clutch 24.

A driven pulley 26 having a notched groove at the outer peripheral portion thereof is mounted on the rotary shaft 25. The endless belt 38 also has notches at its outer edge and is in engagement with the notched groove of the driven pulley 26, so that, as the upper portion of the endless belt 38 is moved, the carriage member 32 is moved. Thus, the driven pulley 26 is driven by the lower portion of the endless belt 38 which moves in the opposite direction to the movement of the carriage member 32.

As the carriage member 32 is moved in the direction of the arrow a, the driven roller 26 is rotated in the direction of the arrow b. Only when the driven pulley 26 is rotated in the direction of the arrow b, is the rotation force of the rotary shaft 25 of the driven pulley 26 transmitted to the reel shaft 20 by the one-way clutch 24, whereby the reel 22 is rotated in the direction of the arrow c. As the reel 22 is rotated in the direction of the arrow c, the ink ribbon 1 is taken up by the reel 22, so that the ink ribbon 1 is moved between (i) the recording medium 2 and (ii) the recording styli 35 and the return electrodes 37.

When the carriage member 32 is moved in the direction opposite to the arrow a, the driven pulley 26 is rotated in the direction opposite to the arrow b, but, in this case, the one-way clutch 24 does not transmit the rotating force of the rotary shaft 25 of the driven pulley 26 to the reel shaft 20.

Under the platen 31, there is disposed an endless belt 27, parallel with the endless belt 38. The endless belt 27 is trained over two pulleys 28 and 29 respectively mounted on the rotary shafts 12 and 13. The pulleys 28 and 29 each have the same diameter as those of the pulleys 10 and 11. When the rotary shaft 12 is rotated, the pulley 28 is rotated and, accordingly, the endless belt 27 is also rotated. As a result, the pulley 29 is rotated. The platen 31 is formed in a cylindrical shape and is rotatably supported by a support shaft 31*a*. The support shaft 31*a* is fixed to an upper portion of the endless belt 27 through a support member 31*b*. The platen 31 can be reciprocated at a predetermined constant speed, together with the upper portion of the endless belt 27, in synchronization with the carriage member 32. As mentioned previously, since the electrode support member 36 for supporting the recording styli 35 and the return electrodes 37 is moved integrally with the carriage member 32, and the recording styli 35 are directed towards the platen 31, the recording styli 35 always face the platen 31. Furthermore, since the ink ribbon 1 is mounted in the carriage member 32 and the midportion of the unwound part of the ink ribbon 1 is always in contact with the recording styli 35 and the return electrodes 37, that portion is always positioned between (i) the recording medium 2 and (ii) the recording styli 35 and the return electrodes 37. The recording medium 2 is intermittently moved upwards or downward by a transportation means (not shown) upon completion of the forward or backward movement of the carriage member 32.

When the carriage member 32 is moved in the direction of the arrow, a pulse-like image-delineating signal voltage is applied to the recording styli 35 with constant time intervals of $\Delta t$ by the image-delineating signal application apparatus (not shown). For instance, a series of image signals, obtained by scanning image information vertically, are numbered from top to bottom and are resolved into odd-numbered image signals and even-numbered image signals. Each of these image signals is amplified to a predetermined drive voltage. The odd-numbered image signals are applied to the first row of the recording styli 35 and the even-numbered image signals are applied to the second row of the recording styli 35, with a time lag of $\Delta t$ with respect to the application of the odd-numbered image signals. When the speed of the carriage member 32 is v, the distance L between the first row of the recording styli 35 and the second row of the recording styli 35 is set so as to satisfy the relationship of $v.\Delta t = L$. For instance, when the odd-numbered image signals are applied to the first row of the recording styli 35 at a time $t_1$ and the even-numbered image signals are applied to the second row of the recording styli 35 at a time $t_1 + \Delta t$ (that is, $\Delta t$ later than time $t_1$), dots are formed on the recording medium 2 by the second row of the recording styli 35 between the dots formed by the first row of the recording styli 35, since, after the period of time, Δt, the second row of the recording styli 35 comes to the position where the first row of the recording styli 35 was.

When image recording is done by the application of image signals to the recording styli 35, the carriage member 32 is moved in the direction of the arrow a. Therefore, the rotation force of the driven pulley 26 is transmitted to the reel shaft 20 through the one-way clutch 24, so that the reel 22 is rotated and the ink ribbon 1 is transported while in contact with the recording styli 35 and the return electrode 37. The transportation speed of the ink ribbon 1 relative to the moving speed of the carriage member 32 is set in such a manner that an unused portion of the ink ribbon 1 is always positioned between the recording styli 35 and the recording medium 2 when recording is done.

Referring back to FIG. 3, when the recording styli 35 have been moved to a right end portion of the recording medium 2 with completion of one-line recording, a new-line signal is applied to the transportation means of the recording medium 2 by a new-line-signal application means (not shown), whereby the recording medium 2 is moved upwards or downwards by the distance equal to a predetermined space between lines and, at the same time, the carriage member 32 is moved in the direction opposite to the arrow a and is returned to a left end portion of the recording medium 2. By the repetition of the above-described operation, images can be recorded on the entire surface of the recording medium 2. When the recording medium 2 is moved upwards or downwards, it is preferable that the ink ribbon 1 be out of contact with the surface of the recording medium 2.

The shape of the platen 31 is not limited to a cylindrical one, but it can be formed in the shape of a flat plate. The drive means for driving the carriage member 32 is not limited to the one described above, but it can be constructed by use of a sprocket and a chain by which the driving force of the motor 15 can be transmitted to the carriage member 32.

As a matter of course, the recording styli 35 can be arranged in one row, instead of two rows described above.

The ink ribbon 1 can be wound onto a pair of reels each of which is not mounted on the carriage member 32, but disposed on the opposite end sides of the recording medium 2 in such a manner that the mid-portion of the unwound part of the ink ribbon 1 is positioned in front of the recording medium 2 and, at the moment the recording is done, the ink ribbon 1 is stopped, but during the period before the next recording is done, the ink ribbon 1 is taken up by one of the reels so as to position a fresh portion of the ink ribbon 1 at the recording styli.

Furthermore, the carriage member 32 can be constructed of a base 33 and a cassette 34 which is detachable from the base 33 and in which the reels 22 and 23 are disposed (refer to FIG. 3).

The embodiments described are intended to be merely exemplary and those skilled in the art will be able to make variations and modifications in them without departing from the spirit and scope of the invention. All such modifications and variations are contemplated as falling within the scope of the claims.

What is claimed is:

1. An electrothermic non-impact recording method for printing with electroconductive thermal-transferable ink on a receiving surface, comprising the steps of:

placing a recording electrode means comprising (i) a plurality of recording styli and (ii) a return electrode in contact with an electroconductive ink ribbon comprising a thermal-transferable ink material, said ink ribbon being in contact with a receiving surface of a recording medium, with the total contact area with said ink ribbon of said recording styli being smaller than the contact area with said ink ribbon of said return electrode;

applying between selected recording styli and said return electrode an image-delineating electric current, through resistor elements, each of which is connected between one of said recording styli and one of the output terminals from which said image-delineating electric current is output, the resistance of each resistor element being in the range of 1/10 to 10 times the resistance between the portion of said ink ribbon between each recording stylus and said return electrode, thus causing said image-delineating electric current to flow through the portions in said ink ribbon immediately below said selected recording styli and to generate Joule's heat in said portions, by which Joule's heat said thermal-transferable ink material in said portions is melted and made transferable; and transferring said thermal-transferable ink material from said ink ribbon to said receiving surface of said recording sheet.

2. An electrothermic non-impact recording method as claimed in claim 1, wherein said recording electrode means is moved relative to said ink ribbon during the recording process.

3. An electrothermic non-impact recording method as claimed in claim 1, where said total contact area of said recording styli with said ink ribbon is not more than one-fifth said contact area of said return electrode with said ink ribbon.

4. An electrothermic non-impact recording method as claimed in claim 1, wherein said thermal-transferable material of said ink ribbon comprises a single electroconductive thermal-transferable layer which comprises a thermo-fusible resin and an electroconductive material, the thickness of said single layer being in the range of 5 μm to 50 μm, and the resistivity thereof being $1\times10^{-2}\Omega$cm to $1\times10^{3}\Omega$cm.

5. An electrothermic non-impact recording method as claimed in claim 1, wherein said ink ribbon further comprises a support material for supporting said thermal-transferable ink material, said thermal-transferable ink material comprising a thermo-fusible resin and an electroconductive material, having a thickness ranging from 5 μm to 50 μm and with a resistivity ranging from $1\times10^{-2}\Omega$cm to $1\times10^{3}\Omega$cm, and said support material having a thickness in the range of 0.5 μm to 20 μm, and an electric resistivity in the range of $1\times10^{1}\Omega$cm to $1\times10^{3}\Omega$cm.

6. An electrothermic non-impact recording method as claimed in claim 1, wherein said ink ribbon is electrically anistropic, with the electric conductivity of said ink ribbon being greater in the direction normal to the surface thereof than in the direction parallel with the surface thereof.

7. An electrothermic non-impact recording apparatus for printing with electroconductive thermal-transferable ink on a receiving surface comprising:

a recording electrode means comprising (i) a plurality of recording styli spaced at a predetermined distance from each other, which recording styli are in contact with an electroconductive ribbon comprising a thermal-transferable ink, in order to allow current to flow through said ink ribbon and to generate Joule's heat therein, and (ii) a return electrode which is in contact with said ink layer, and is disposed at a predetermined distance from said recording styli, with the total contact area with said ink ribbon of said recording styli being smaller than the contact area with said ink ribbon of said return electrode;

an image-delineating signal application means which is connected to said recording styli and to said return electrode and applies a predetermined image-delineating voltage across each portion of said ink ribbon between said recording styli and said return electrode, through resistor elements, each of which is inserted between one of said recording styli and one of the output terminals of said image-delineating signal application means from which said image-delineating electric current is output, the resistance of each resistor element being in the range of 1/10 to 10 times the resistance between the portion of said ink ribbon between each recording stylus and said return electrode, thus causing said image-delineating electric current to flow through the portions in said ink ribbon immediately below said selected recording styli and to generate Joule's heat in said portions, by which Joule's heat said thermal-transferable ink material in said portions is melted and made transferable;

a reciprocating means for reciprocating said recording electrode means, passing over the surface of said recording medium, with said recording electrode means being in contact with said ink ribbon; and a winding means for winding said ink ribbon thereon in the course of recording process in synchronization with the movement of said recording electrode means.

8. An electrothermic non-impact recording apparatus as claimed in claim 7, wherein said winding means comprises a pair of reels on which said ink ribbon is wound, one of said reels being a take-up reel and driven in only one direction during the recording process, in synchronization with the movement of said recording electrode means during the recording process.

9. An electrothermic non-impact recording apparatus as claimed in claim 8, wherein said winding means and said recording electrode means are fixed to a first portion of a drive endless belt and integrally movable by said drive belt, and said take-up reel is driven only in the take-up direction, through a one-way clutch, by a rotary shaft which is in engagement with a second portion of said drive endless belt, said first portion and second portion of said drive endless belt moving in opposite directions relative to each other.

* * * * *